Oct. 14, 1969 P. J. ESTOCK 3,472,958

FACSIMILE SYSTEM

Filed Aug. 1, 1966 6 Sheets-Sheet 1

INVENTOR.
PAUL J. ESTOCK

BY William D. Tennant[signature]

ATTORNEY

Oct. 14, 1969 P. J. ESTOCK 3,472,958

FACSIMILE SYSTEM

Filed Aug. 1, 1966 6 Sheets-Sheet 2

INVENTOR.
PAUL J. ESTOCK

BY Anthony D. Cennamo

ATTORNEY

Oct. 14, 1969

P. J. ESTOCK 3,472,958

FACSIMILE SYSTEM

Filed Aug. 1, 1966

6 Sheets-Sheet 3

INVENTOR.
PAUL J. ESTOCK

BY Anthony D. Cennamo

ATTORNEY

Oct. 14, 1969 P. J. ESTOCK 3,472,958

FACSIMILE SYSTEM

Filed Aug. 1, 1966 6 Sheets-Sheet 4

INVENTOR.
PAUL J. ESTOCK

BY Anthony D. Cennamo

ATTORNEY

INVENTOR.
PAUL J. ESTOCK

BY [signature]

ATTORNEY

Oct. 14, 1969 P. J. ESTOCK 3,472,958

FACSIMILE SYSTEM

Filed Aug. 1, 1966 6 Sheets-Sheet 6

INVENTOR.
PAUL J. ESTOCK

BY Anthony D. Cennamo

ATTORNEY

United States Patent Office 3,472,958

Patented Oct. 14, 1969

3,472,958

FACSIMILE SYSTEM

Paul Joseph Estock, Malibu, Calif., assignor to Xerox Corporation, Rochester, N.Y., a corporation of New York Filed Aug. 1, 1966, Ser. No. 569,276
Int. Cl. H04n 5/38, 3/16
U.S. Cl. 178—7.2 13 Claims

ABSTRACT OF THE DISCLOSURE

Detection circuitry for facsimile apparatus comprising positive and negative peak detectors, each including a plurality of parallel asymmetrically conductive, polarity sensitive current paths for establishing varying charge levels on individual background capaictors, are employed in conjunction with a normal background reader to generate a plurality of control signals respectively proportional to the excursions of a composite video and noise signal. Logical gating means is employed to select predetermined portions of the control signals on a polarity basis in accordance with the particular excursions of the composite video and noise signal to generate a dynamic clipping level. The dynamic clipping level describes an envelope slightly more negative and the positive excursions of the composite video and noise signal when information is being detected and slightly more positive than negative excursions when background is being detected.

This invention relates generally to graphic communication systems and more particularly to improved background compensating video signal detection circuitry for graphic communication systems.

In conventional facsimile systems, information on a document to be transmitted is normally converted into electrical signals by means of an electro-optical scanning apparatus. In one such electro-optical scanning apparatus a document to be transmitted is scanned by a sharply focused spot of light, for example, from a flying spot scanner. The reflected light rays from the document which are modulated in accordance with the reflectivity of the document being scanned are focused onto a light sensitive detector, for example, a photomultiplier tube.

The electric video signals generated by the photodetector are then suitably shaped and/or modulated and transmitted via radio or land line communication circuits to a distance receiver. At the receiver the video signals along with suitable synchronizing and phasing signals are employed to control the selective actuation of a marking apparatus. Thus the marking apparatus in response to received video and control signals creates a facsimile of the original document.

In facsimile systems that utilize a sharply focused beam of light for scanning an original document at the transmitting station, the analog signals generated by the light responsive detector are proportional to the reflectivity of the document along a predetermined scanning raster. One undesirable characteristic inherent in such electro-optical conversion apparatus and associated video circuits is that it is difficult to adequately distinguish between variations or shifts in the background level and variations or signal excursions corresponding to information markings on the document. The presence of a dark background on an original document may simply comprise colored paper. In other instances documents being transmitted may have a substantially white background with colored portions inked thereon. Even where the source of image exploring rays from the image exploring device are maintained reasonably constant, a wide range of reflectivity and contrast ratios of the original documents generally results in wide variations in the amplitude of the analog signals generated.

As is known in the art, for a facsimile receiver to accurately recreate the original document it is necessary that the detection circuitry at the transmitter be able to adequately distinguish between and truly characterize variations in the background levels from variations in the analog signal due to information printed on the original document. This problem of detecting and adequately distinguishing information markings from background variations is particularly acute where original documents have colored portions which may have information printed thereon. Unless the video circuitry of the transmitting station is capable of correctly distinguishing shifts in background as well as information signals in the presence of shifts in background level, the normal characteristics of a flying spot scanner in a two level system results in the transmission of the darker background area as "black" with the result loss of any information printed thereon.

In copending applications Ser. No. 329,640, now Patent No. 3,394,222 filed Dec. 11, 1963, and Ser. No. 461,693, filed June 7, 1965, which are of common ownership with the assignee of the present invention, there is disclosed various improved facsimile video circuitry which largely obviates the hereinbefore described difficulties inherent in prior art facsimile systems. While the improved facsimile system and video circuitry disclosed in the above mentioned copending applications does automatically adjust or compensate for varying background reflectivity levels of documents, adequate provision has not been made to insure the detection of high resolution video signals in the presence of widely varying levels. Another problem in the hereinbefore mentioned prior art apparatus has been to insure the detection of both low contrast information signals as well as high resolution information signals in a composite video and noise analogue signal.

It is therefore an object of the present invention to improve video detection circuitry for facsimile apparatus.

It is another object of the present invention to provide improved background compensating video circuitry for facsimile apparatus.

It is a still further object of the present invention to provide improved background compensating detection means for automatically compensating for signal variations occasioned by variations in the reflectivity of an original document.

It is another object of the present invention to facilitate the detection of high frequency signal components and low contrast information signals in a composite video and noise analogue signal.

It is yet another object of the present invention to provide improved detection apparatus for properly characterizing high frequency, high resolution information components as well as low contrast information components of a composite video and noise analogue signal.

It is still another object of the present invention to provide improved dynamic clipping apparatus for facsimile video circuits capable of acutely and reliably detecting high resolution information signals in the presence of widely variable background signal levels.

The above and other desirable objects are achieved in accordance with the principles of the present invention by providing polarity sensitive logical gating means for selectively determining the dynamic clipping or slicing level.

In accordance with the preferred embodiment of the present invention positive and negative peak detectors, each including a plurality of parallel asymmetrically conductive, polarity sensitive current paths for establishing varying charge levels on individual background capacitors, are employed in conjunction with a normal background reader to generate a plurality of control signals respectively proportional to the excursions of a composite video and noise signal. Logical gating means is employed to select predetermined portions of the control signals on a polarity basis in accordance with the particular excursions of the composite video and noise signal to generate a dynamic clipping level. In the preferred embodiment the dynamic clipping level describes an envelope slightly more negative and the positive excursions of the composite video and noise signal when information is being detected and slightly more positive than negative excursions when background is being detected.

For a more complete understanding of applicant's invention and various novel features thereof reference may be had to the following detailed description in conjunction with the accompanying drawings in which.

Figure 1:
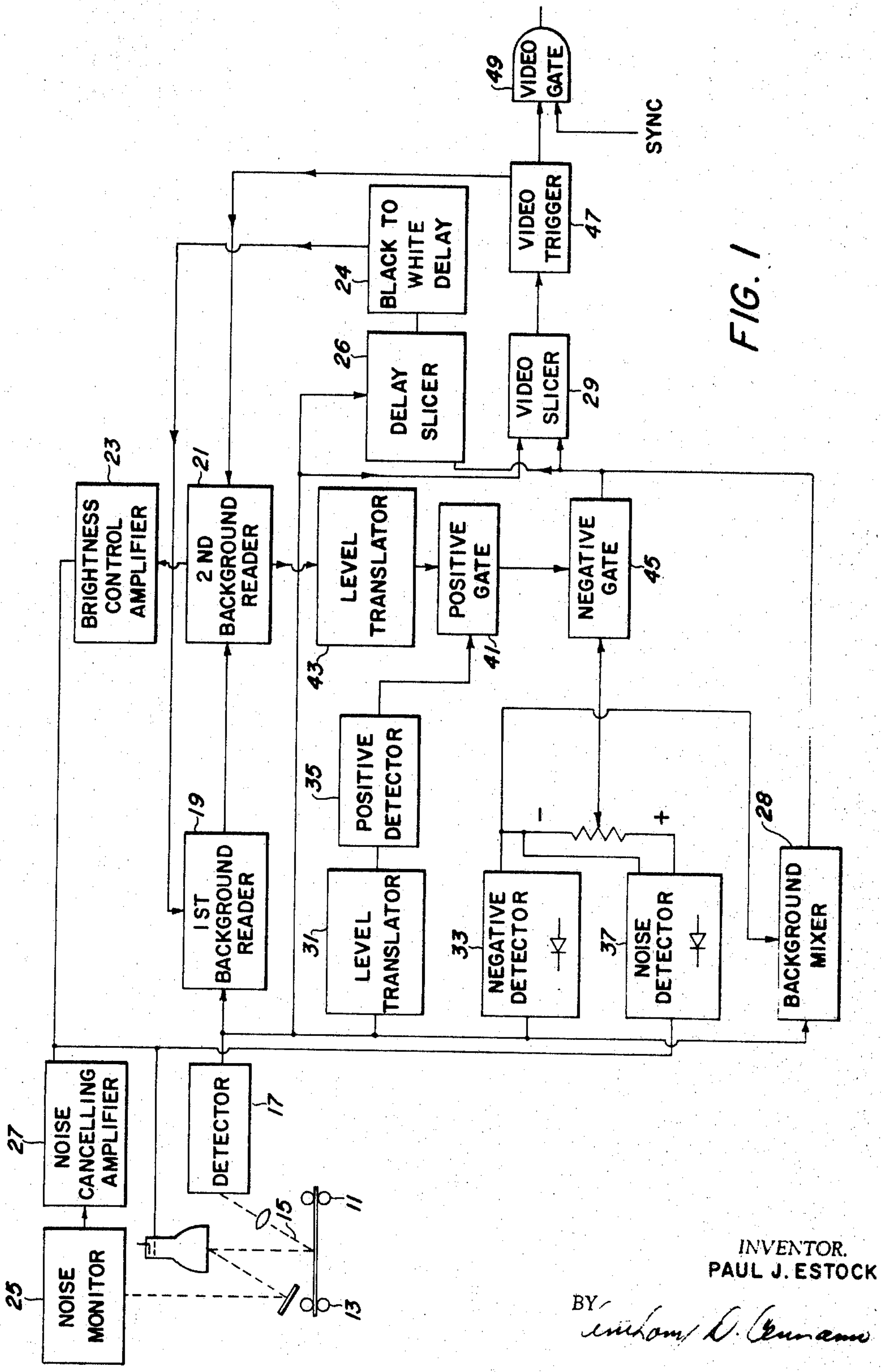
FIG. 1 is a block diagram of a facsimile transmitter embodying the principles of the present invention.
Figure 4:
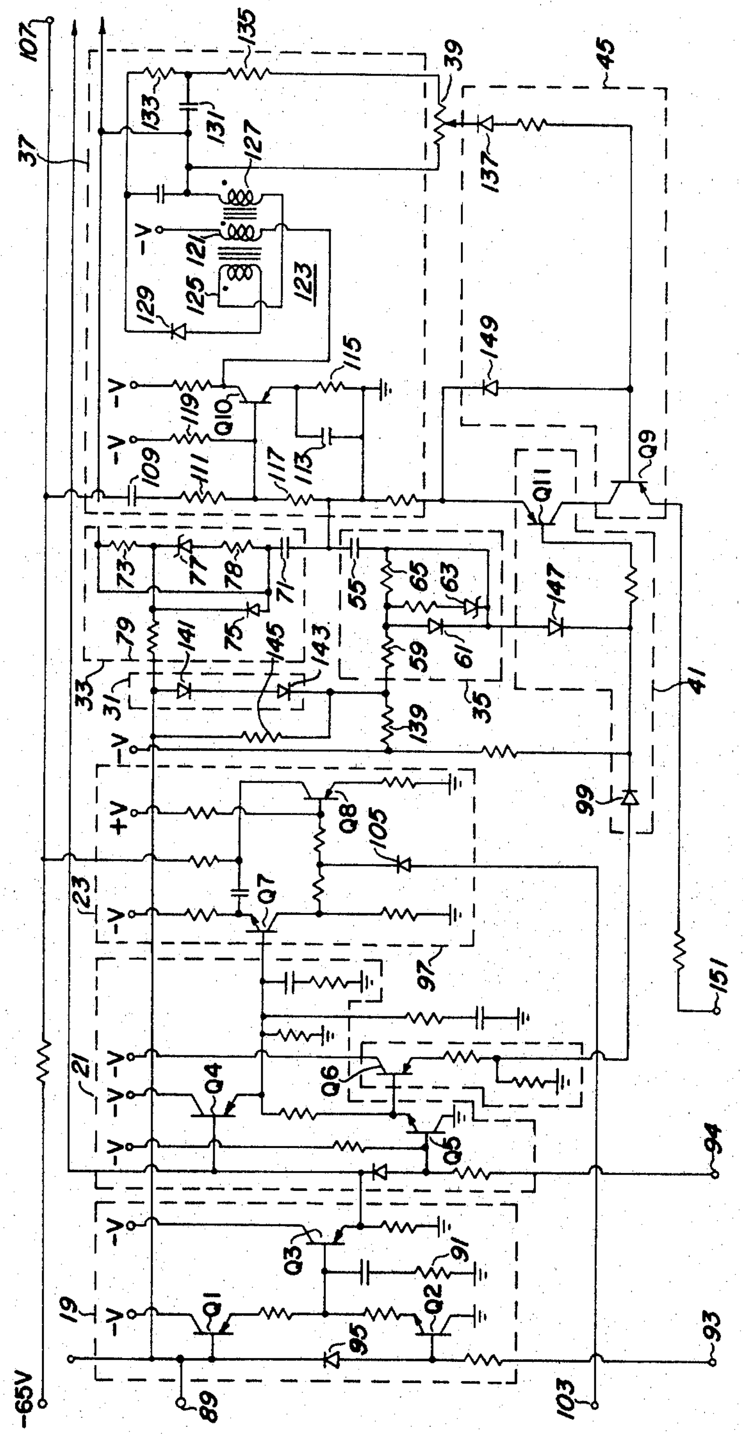
Figure 5:
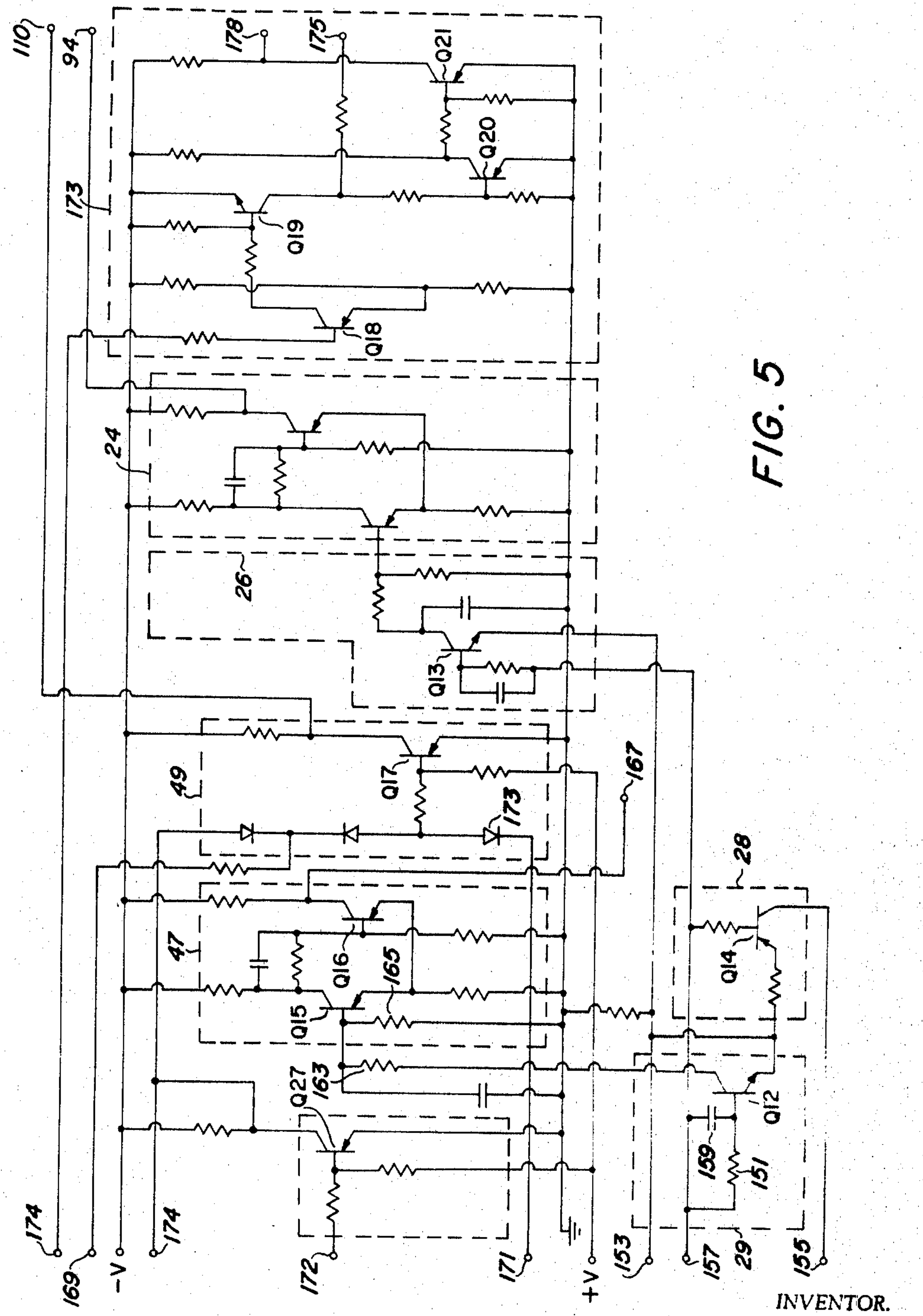
Figure 6:
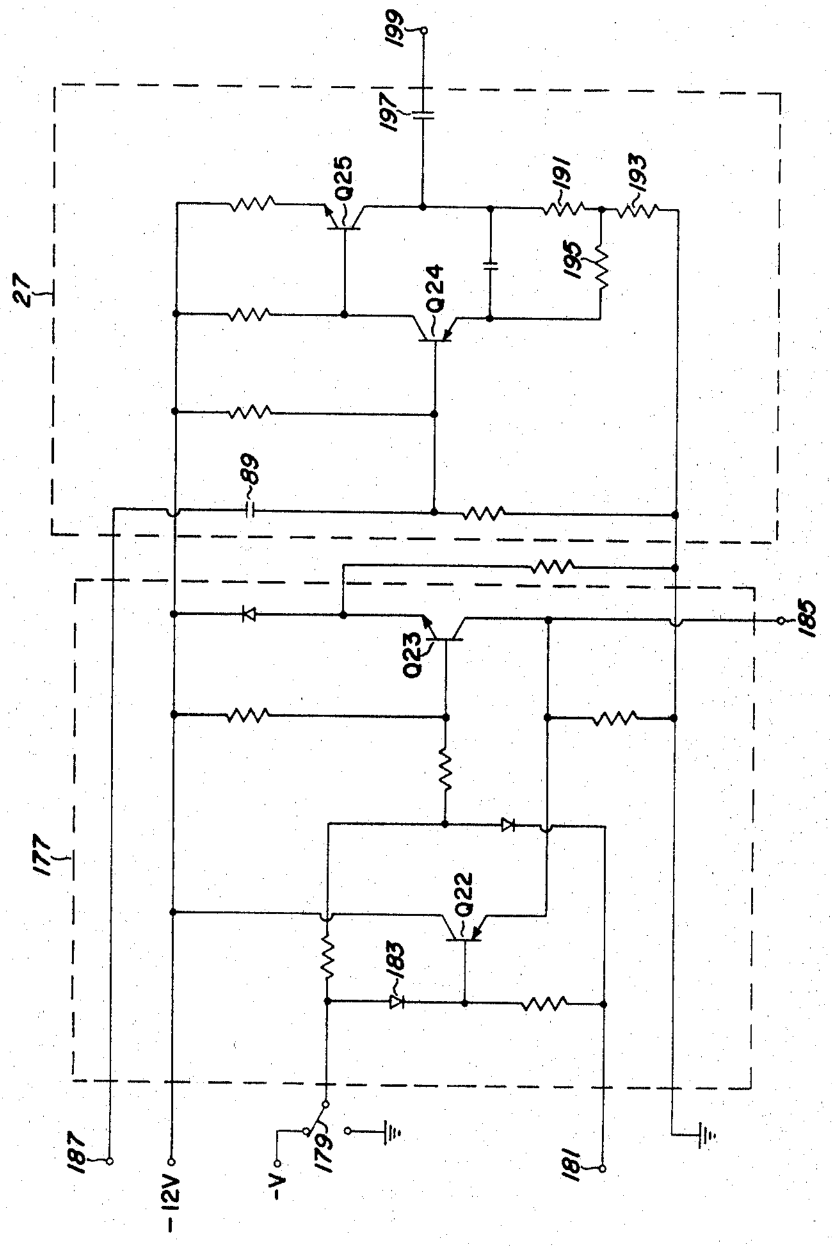

FIGS. 4, 5, and 6 are circuit diagrams illustrating the preferred embodiment of various portions of the video circuitry in accordance with the principles of the present invention as illustrated in FIG. 1.

Figures 2, 7:
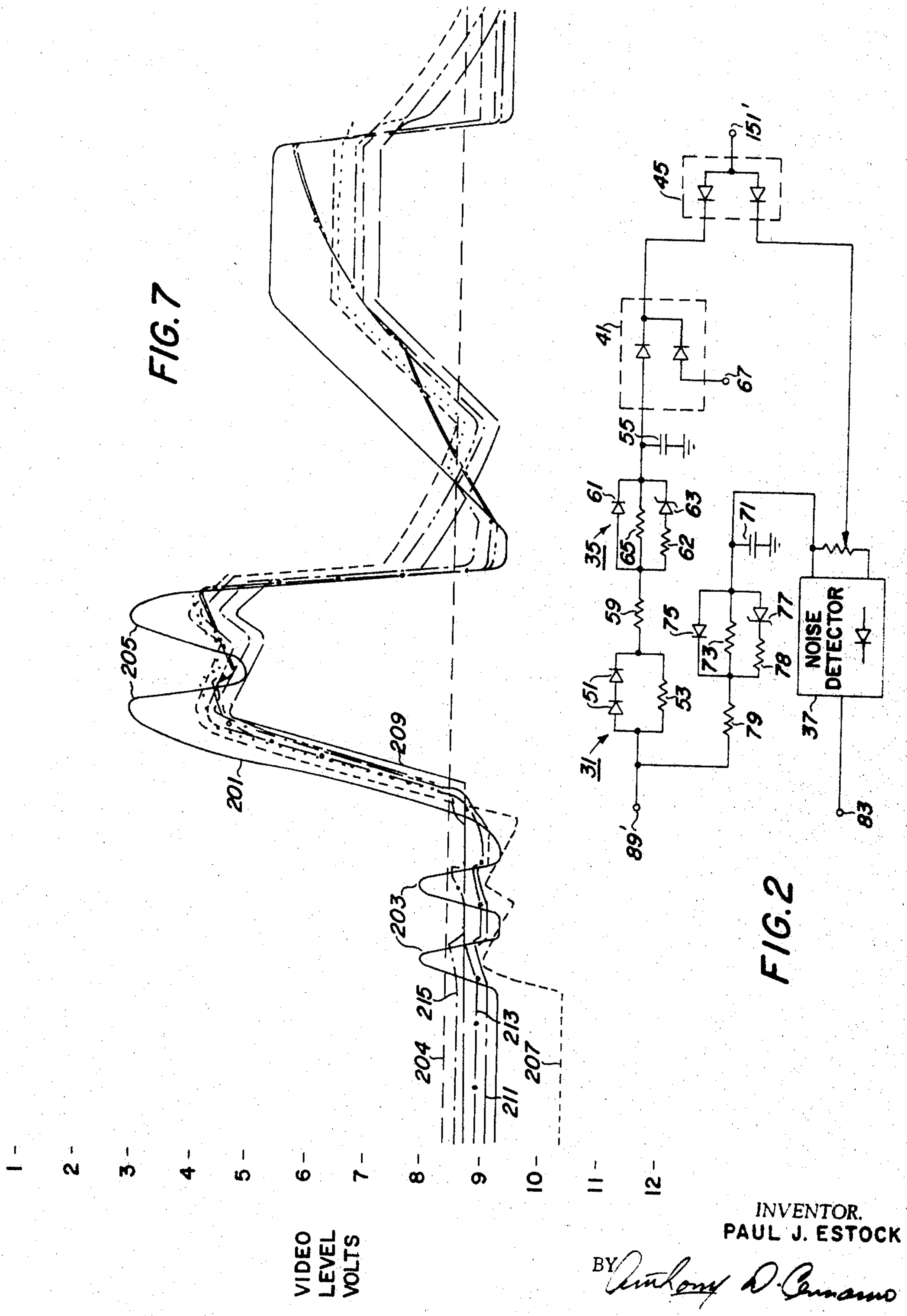
FIG. 2 is a circuit diagram of a dynamic clipping level generator embodying the principles of the present invention.

FIG. 7 illustrates a series of waveforms useful in understanding the operation of the preferred embodiment of applicant's dynamic clipping apparatus as shown in FIGS. 2 and 4.

Referring now to FIG. 1 there is shown a block diagram of the improved facsimile video circuits embodying the principles of the present invention. In accordance with the general operation of this system of a document 11 is moved along a predetermined path by rollers 13 past a scanning station at which image exploring rays 15 from a light source (CRT) are projected onto the document surface to form a raster type sweep. The light rays generated by the cathode ray tube are intensity modulated by the information on the record or document 11 and the reflected information modulated light rays are focused onto a light response detector 17. The light responsive detector may comprise a photomultiplier circuit for translating the reflected information modulated light rays into corresponding analog electric video signals. Functionally the analog electric video signal from the detector 17 is employed to generate three control signals for facilitating the interpretation of or identification of signal portions from the composite signal and noise analog signal.

The first control signal is generated in the first and second background reader circuits 19 and 21 wherein an appropriate voltage level is generated indicative of the background level or past history of the document being scanned. The signal from the second background reader circuit 21 is coupled to the brightness amplifier 23 which in conjunction with the phosphor noise monitor 25 and the noise concealing amplifier 27 generates an appropriate signal for controlling the brightness of the illuminating rays from the image exploring device. As shown the intensity of the illuminating rays is controlled by varying the brightness of the CRT spot. The structure and operation of the illumination control circuitry is set forth in the hereinabove mentioned copending application, Ser. No. 461,693.

The second control signal generated in response to the analog signal emanating from light sensitive detector 17 is a dynamic clipping level. This clipping level, as will hereinafter be more fully explained, is coupled as one input to video slicer 29 and enables the video slicer to determine which portions of the analog signal correspond to information signals and which portions correspond to noise and background signal. Generally speaking in accordance with the principles of the present invention the analog signal excursions control the dynamic clipping level such that the dynamic clipping level follows the analog signal within an envelope described by a level following above the positive peaks of the background present when background is being detected and by a level slightly more negative, i.e., just below the negative noise peaks, than the positive peaks when information signals are being detected. As shown the analog signal from the image exploring device 17 is coupled in parallel to the input of a video signal level translator 31, the negative peak detector and stretcher circuit 33 and one input of the video slicer circuit 29. The output of the signal translator 31 is coupled to the input of a positive peak detector circuit 35.

The structure and operation of the positive and negative peak detector circuits are similar and will hereinafter be more fully explained. Briefly the negative peak detector generates a dynamic clipping level determining signal by controlling the charging of a capacitor at a predetermined rate when the analogue signal excursion is going negative and a different rate when the excursions are in the positive direction. The respective time constants, i.e., charging rates, are chosen such that the dynamic level follows above the background and noise peaks when properly translated and when the signal excursions are going positive the charging follows the signal just below the negative noise peaks when properly translated. As shown a portion of the noise signal from the noise cancelling amplifier 27 is coupled through the noise detector and rectifier 37 to a slicer control 39 which may be employed to translate the output of the negative peak detector in a positive, i.e., information direction.

The output of the positive peak detector is coupled as one input to positive OR gate 41. The other input to positive OR gate 41 is taken from the output of the second background reader 21 through a level translator circuit 43. The most positive signal on either of the inputs to positive OR gate 41 is coupled from the output thereof as one input to the two input negative OR gate 45. The other input to negative OR gate 45 is coupled to the slicer control 39 which taps off the desired translated signal from the combined negative peak detector 33 output and noise rectifier-detector circuit 37. The output signal level from negative OR gate 45 represents a dynamic clipping level and as such is coupled to one input of video slicer 29.

With the dynamic clipping level coupled to one input of the video slicer 29 and the raw video signal emanating from the image detecting device 17 coupled to the other input, an information or black signal level is generated each time the instantaneous amplitude of the analog video signal is more positive than the dynamic clipping level. The output of the video slicer 29 is coupled to the video trigger 47 wherein constant amplitude signals are generated corresponding to the detected white and black portions of the original document along a predetermined scanning raster as characterized by the video slicer. The output of the video trigger 47 is coupled to the input of a video-sync gate 49 wherein the video signals are suitably mixed with synchronizing signals and coupled to an output terminal for transmission to a remote receiver.

The hereinabove recited operation is further modified by the third control signal generated by the black to white delay slicer 24 and black to white trigger 26 network. In order to prevent the background reader circuits from gradually following, i.e., charging to the average of the information signals, the background circuits are selectively gated by signals generated in the black to white delay circuit. In the black to white delay circuit, the composite video signal is compared with the dynamic slicing level to indicate when information signals are being detected. The output of the black to white delay trigger generates an appropriate control signal for preventing the background circuits from charging during the detection of information signals. The structure and operation of the black to white delay circuits and the more complete explanation thereof may be had by referring to the hereinbefore described copending applications Ser. Nos. 329,640 and 461,693.

From the above description it may be seen that when background is being detected the background reader capacitor maintains a suitable voltage level representing prior background reflectivity history. For darker back-(grounds the illuminating rays from the light source through the feedback loop are made more intense over an applicable range thereby attempting to further illuminate the document to compensate for background variations. The increasing illumination generates greater source noise signals in an approximately direct proportion. As will hereinafter be more fully explained the translating operation of the noise detector rectifier 37, slicer control 39 and negative peak detector 33 automatically compensates for this increase noise component of the composite video and noise signal by translating the negative signal level away from the noise peaks in the background. The range for the translated negative peak detector and translator is essentially independent of frequency because the output of the positive OR gate 41 prevents loss of low frequency detection and the following of the dynamic clip level relative the analog signal is speed limited only by the noise content of the composite video noise signal.

Referring now to FIG. 2 there is shown a block diagram of the preferred embodiment of the dynamic clipping circuit in accordance with the principles of the present invention. The dynamic clipping circuit in accordance with the preferred embodiment of the present invention generates a clipping level which dynamically follows the analog video signal within an envelope described by a level following above the positive peaks of background noise when background is being detected and by levels slightly more negative than the positive peaks when information signals are being detected. By employing the dynamic clipping level in accordance with the principles of the present invention, an information signal which rises above the background noise may be detected with no loss in low contrast resolution. By employing applicant's dynamic clipping level, detection is independent of signal frequency thus facilitating the detection of low contrast signals near the background level as well as more positive high frequency signal levels near the normal information level.

As was hereinbefore stated the dynamic clipping level in accordance with one aspect of the present invention is generated by logically selecting portions of one of a plurality of control signals as the instantaneous clipping level. As shown in FIG. 2 and FIG. 1 the raw video signals from the detector 17 is coupled to a positive peak 35 or slow detecting circuit via a video signal level translator 31. The video level translator assures that the output signal of the positive peak detector will be a predetermined magnitude more negative than the raw video. The forward drop of the two diodes 51 in parallel with the resistor 53 insures that the translated video signal coupled to the positive peak detector will be more negative than the instantaneous value of the raw video. In the positive peak detector capacitor 55 is charged to the level proportional to the instantaneous excursions of the analog video signal.

Figures 3A, 3B, 3C, 3D, 3E:
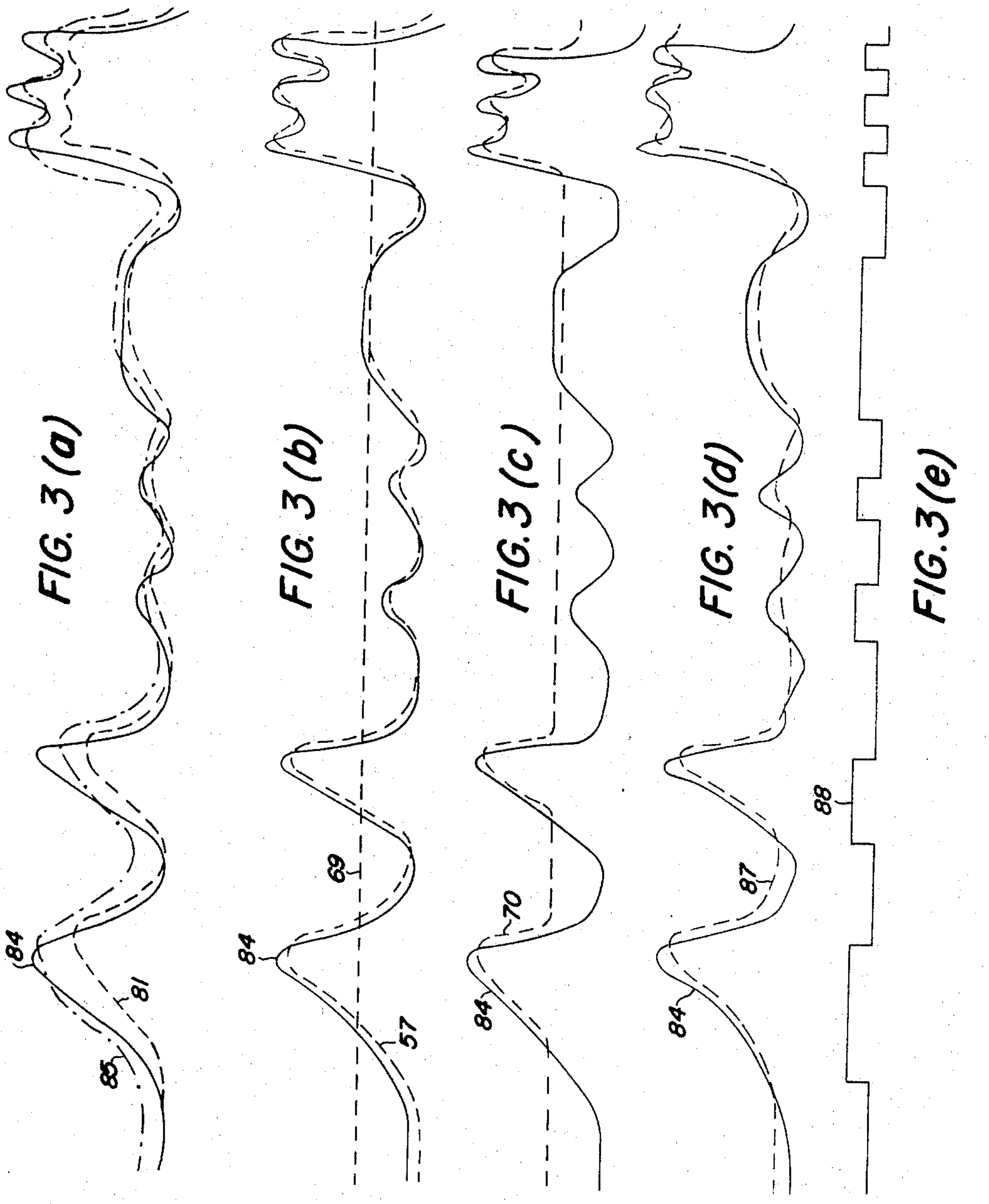
FIG. 3 illustrates various signal waveforms useful in understanding the operation of a dynamic video clipping circuitry in accordance with the principles of the present invention.

As shown in FIG. 3*b*, the charge on the positive peak detector capacitor 55, as illustrated by curve 57, lags and substantially follows the analog video signal. When the excursion in the raw video signal goes positive, capacitor 55 is charged through a path including the resistor 59 and the parallel paths including diode 61, Zener diode 63 and resistor 65. When the excursions of the analog signal exceed the threshold level of the Zener diode 63, i.e., on the negative swing, the discharge is more rapid as the Zener diode path in the avalanche mode is in shunt with the resistive element 65. Below the Zener threshold, the capacitor's time constant is determined by resistors 59 and 65 in series. The output of the positive peak detector is coupled to one input of the positive OR gate 41. The other input to the positive OR gate 41, as was hereinbefore described in conjunction with FIG. 1, is generated by the background reading circuit and coupled to the input terminal 67. A representative background level signal from the background reader (FIG. 1) is illustrated as curve 69 in FIG. 3*b*. Curve 70 of FIG. 3*c* illustrates a composite or output curve generated by the positive OR gate 41 in which the most positive portion of the respective outputs from the positive peak detector curve 51 and the background level signal curve 69 coupled to terminal 67 are combined.

A third dynamic clipping level determining signal is generated from the raw video signal by the negative peak detector circuit 33. The negative peak detector circuit is similar in structure and function to the hereinbefore described positive peak detector. The charge on capacitor 71 is controlled by the various time constants determined by the polarity sensitive paths of the negative peak detector 33. The time constants or rates are such that when the video signal is going negative, the voltage level on capacitor 71 follows at a time constant determined by the resistor 73 in parallel with the forward biased diode 75. Similarly when the excursions of the raw video signal are going positive the charging rate of capacitor 71 follows at a rate proportional to the magnitude of the signal. When the Zener diode 77 is in the avalanche condition it controls the charging of capacitor 71 which then rapidly follows towards the more positive peak. When the Zener 77 is below the threshold level, the charging is controlled by the series disposed resistors 73 and 79. For excursions of the video signal in the negative direction forward biased diode 75 effectively shunts resistor 73 thereby lowering the time constant of capacitor 71. A typical waveform generated by the negative peak detector in response to excursions of the video signal is illustrated as waveform 81 in FIG. 3*a*.

In accordance with another aspect of the present invention the output of the negative peak detector 33 may be selectively shifted in the positive direction to compensate for the noise generated by the cathode ray tube trace. As shown, the signal generated by the CRT noise monitor (FIG. 1) and employed as hereinbefore described to control the brilliance of the CRT trace, is coupled from terminal 83 to a rectifier circuit 37. The output of the rectifier circuit is coupled across a potentiometer slicer control 39 and the output of the negative peak detector is coupled to one end of the potentiometer. As shown in waveform 85 of FIG. 3*a*, the output of the negative peak detector may be selectively shifted positive an amount determined by the positioning of the tap of the potentiometer 39. In addition, the output of the negative peak detector will automatically be shifted more positive a predetermined amount proportional to the instantaneous noise content of the CRT trace since the output of the negative peak detector is referenced, as will be hereinafter more fully explained, to the level from rectifier 37.

The output of the negative peak detector 33 and the output of the positive OR gate 41 are coupled as respective inputs to negative OR gate 45. The composite clipping level signal which emanates from the negative OR gate 45 is shown as waveform 87 in FIG. 3*d*. With the respective dynamic clipping level and the composite video and noise signal 84 coupled to the slicer circuit (FIG. 1), the video binary signal waveform 88 illustrated in FIG. 3*e* is generated at the slicer circuit 29 indicative of the information content of the analog signal generated for a portion of the document being scanned.

Referring now to FIGS. 4, 5, and 6 there are illustrated schematic diagrams of the preferred embodiment of various circuits functionally illustrated in the block diagram of FIG. 1. For convenience, the circuitry illustrated in FIGS. 4, 5 and 6 has been broken up and the circuit apparatus performing the functions illustrated in FIG. 1 have been similarly numbered. Functionally the circuitry illustrated in FIG. 4 generates necessary bias levels for two similar transistors stages to facilitate the satisfactory identification of any information signals present in the analog video signal generated while scanning various shades or colors of original copies. In addition, circuits illustrated in FIG. 4 sense the copy background level to providing the necessary bias to control the illumination level of the image exploring rays emanating from the flying spot scanner to maintain the analog signals within range compatible with circuit capabilities as well as to provide corrections or to the CRT for light intensity variations due to optical deficiencies over a line of scan.

As hereinbefore discussed in conjunction with FIG. 1 the analog video signal from the scan detector 17 is coupled in parallel to a plurality of detector circuits for developing dynamic clipping level determining signals. The outputs of these respective circuits, namely, the positive and negative detectors 35 and 33 and the background reading circuits 19 and 21 are combined to provide a dynamic clipping level for the video slicer 29. As shown in FIG. 4 the video signal is coupled to input terminal 89 and from there is coupled to the input of the first background reader 19, to the input of the negative peak detector circuit 33 and to the input of the video signal translator circuit 31. In response to the excursions of the video signal complementary emitter followers $Q_1$ and $Q_2$ control the selective charging of the first background capacitor 91. An input from the black and white delay circuit on terminal 93 controls the forward biasing of diode 95 thus preventing the negative excursions of the video signal from charging the first background capacitor 91 negative during the detection of information signals. The output of the first background reader is coupled via buffer transistor $Q_3$ to the input of the second background reader circuit 21. The second background reader circuit similarly comprises a pair of complementary emitter followers $Q_4$ and $Q_5$ for controlling the charging of the second background capacitors 97 in response to excursions in the video signal reflected in the charging of the first background capacitor. In this manner the cascade time constance of the first and second background capacitor control the generation of a DC signal proportional to the average background reflectively of the document being scanned. The output of the second background reader circuit is coupled via isolation amplifier $Q_6$ as one input to positive OR gate 41 through diode 99.

The signal coupled to one input of positive OR gate 41 through diode 99 represents an average DC level signal corresponding to the background reflectivity level of the document being scanned. When excursions in the video signal are not detected as information, the first background capacitor 91 charges through $Q_1$ and $Q_2$ to the detected background level. When information excursions in the composite raw video signal are detected as information signals, $Q_1$ and $Q_2$ are biased off by the reverse biasing effect of the charge on capacitor 91 and the control signal from the video trigger coupled to terminal 93 respectively.

The background level on the second background capacitor 97 is coupled to the input of the CRT brightness control amplifier 23. In the absence of a logical control signal on terminal 103 which indicates the CRT beam is off, the background signal coupled to the input of the base electrode of $Q_7$ of the brightness control amplifier generates an appropriate signal for controlling the brightness of the CRT thereby varying the intensity of the image exploring rays as a function of the background signal. The logical control signal coupled to terminal 103 indicating that the beam is off prevents the circuit from attempting to turn up the brightness during flyback or retrace time. The beam indicating control signal is coupled via diode 105 to the respective collector and the base electrodes of $Q_7$ and $Q_8$ of the brightness amplifier respectively. The output signal from the brightness control amplifier is coupled to the cathode ray tube grid from terminal 107 to control the intensity of the image exploring rays over a predetermined range.

The analog video signal coupled to input terminal 89 is also coupled to the input of the negative peak detector circuit 33. In response to positive excursions in the raw video signal capacitor 71 charges through a path including resistor 79 and resistor 73 paralleled by Zener diode 77 and resistor 78. The Zener diode 77 and resistor 78 preferably provide approximately five microseconds lag in the charging of capacitor 71 up to and with approximately 3 volts of the positive going video signal excursion. Resistor 73 permits capacitor 71 to charge much more slowly toward positive excursion levels after the Zener diode conduction has been reduced. In response to negative video signal excursion, resistor 79 in series with forward biased diode 75 forms a low resistance path which permits capacitor 71 to charge very rapidly to the new level within, for example, only a two microsecond time lag.

To prevent the detection of noise as legitimate information signals the output of the negative peak detector is combined with the output of the CRT trace noise detector and rectifier circuit 37. To translate the output from the negative peak detector 33 so that only positive going signals above the background noise level will cause the video slicer transistor to recognize the signals as legitimate information signals the output of the negative peak detector is referenced to a DC noise level. A portion of the output noise signal from the brightness control amplifier 23 is coupled from terminal 107 via capacitor 109 and resistor 111 to the input of noise trace amplifier $Q_{10}$. The signal thus coupled to the base electrode of $Q_{10}$ represents a portion of the background noise level. Capacitor 113 provides emitter peaking across resistor 115 while resistors 117 and 119 maintain transistor $Q_{10}$ normally biased on.

The output of noise trace amplifier $Q_{10}$ is coupled to the primary winding 121 of transformer 123. The two secondary windings 125 and 127 are connected in series to provide voltage amplification of the signal coupled to the primary winding. Rectifier 129 is coupled in the secondary series winding circuit to rectify the noise pulses and to provide an asymmetric charging path for filter capacitor 131. Resistor 133 permits filter capacitor 131 to charge toward the average positive value of the noise peaks over a predetermined time constant. The capacitor 71 of the negative peak detector circuit is coupled to and arranged to discharge through resistors 39 and 135 of the clip level circuit toward a noise determined level. Since the transformer secondary is referenced to the level on the negative peak detector capacitor 71 the output of the negative peak detector may be shifted in a positive direction by a DC voltage level directly proportional to the noise level present in the background signal.

Clip level potentiometer 39 is arranged to vary the potential shift of the negative detector output signal that is coupled to the cathode of diode 137 which comprises one input of the negative slicer gate 45. As hereinbefore described in conjunction with FIG. 1 the other input to the negative OR gate 45 is generated by the positive OR gate 41.

The third control signal for determining the instantaneous amplitude of the dynamic clipping level is generated by the positive peak detector 35. As hereinbefore stated one input to the positive OR gate 41 is coupled from the second background reader circuit capacitor 97 via diode 99. The second input to the positive OR gate is generated by the positive peak detector 35. The raw video signal coupled via signal translator 31 to the input junction 139 of the positive peak detector. In the signal translating circuit 31 the forward drop of diodes 141 and 143 in parallel with which resistor 145 provides approximately a one volt negative shift in the raw video signal level. This operation of the signal translating circuit insures that the signal and noise components in the video signal seen by the positive peak detector 35 are always more negative than the integrated output of the negative peak detector, i.e., the signal translator is faster than the integrating operation of the charging of the capacitor of the negative peak detector circuit 33.

The output signal from the signal translator circuit 31 is coupled to the input of positive peak detector 35 and the negatively translated raw video signal is employed to control the charging of capacitor 55 in a manner similar to the hereinabove described control of the capacitor 71 of the negative peak detector. The time constant associated with the positive peak detector capacitor are essentially the reverse of those found in the negative peak detector. In the positive peak detector in response to positive excursions the charge on capacitor 55 is changed rapidly to follow the positive excursions and similarly the charge on capacitor 55 follows more slowly any negative excursions in the shift and video signal.

In response to analog signal excursions in the positive direction capacitor 55 is charged through resistor 59 and the forward biased diode 61. In response to signal excursions in the negative direction Zener diode 63 speeds up the discharge of capacitor 55 during the avalanche or Zener conduction state and thereafter resistors 59 and 65 permit the level on capacitor 55 to follow negative signal excursions after Zener conduction is reduced. The output from the positive peak detector 35 is coupled via diode 147 to the input of the transistor $Q_{11}$ of the positive OR gate 41.

In response to signals coupled to the anode electrodes of diodes 99 and 147 of the positive OR gate, the most positive signal thereof is generated at the emitter electrode of transistor $Q_{11}$ and is coupled via diode 149 to the base electrode of the negative OR gate transistor $Q_9$. As hereinbefore stated the other input to the negative OR gate is coupled via diode 137 from the tap of clip level potentiometer 39. In response to the input of the signals to the negative OR gate, the most negative signal is reflected in the emitter circuit of transistor $Q_9$ and coupled from terminal 151 to the slicer or digital detector 29 as shown in FIGS. 1 and 5. Thus, in response to the generation of the background signal and the signal proportional to the positive and negative peaks, a dynamic clipping level proportional to the most positive and most negative of these respective signals is generated for controlling the digital video detector such that any signal rising above this dynamic level will be recognized as signal information and any signal below this clipping level will be denominated noise or background.

Referring now to FIG. 5 the preferred circuit embodiments of the video slicer 29, black to white delay slicer and trigger 26, background noise mixer 28, and video gate 49 are shown. The output of the video trigger 47 represents the two black and white levels corresponding to the information markings and background of the scan copy respectively. After proper blanking, pulse stretching and sync insertion, the output of the video-sync gate 49 represents the final output train of the facsimile transmitter. The output of the black to white delay circuits 24 and 26, as was hereinbefore stated, is employed to selectively control the charging of the second background reader. By preventing the background reader from following negative excursions during the detection of video information signals, the video signal is prevented from becoming more negative than the background level. Generally this is accomplished by controlling the operation of the background detector particularly in the presence of high resolution information signals. In the presence of such high resolution signals, the duty cycle of the black to white delay control signal reduces the duty cycle of the second background reader thereby preventing the charging of the background level capacitor to a higher value than the signal level.

The output signal from the slicer OR gate (FIG. 4) is coupled to terminal 153 and is employed to establish the emitter bias on the video slicer transistor $Q_{12}$ and the black to white delay slicer transistor $Q_{13}$. The output signal from the negative peak detector 33 (FIG. 4) is coupled to terminal 155 and employed to establish a collector bias on the emitter follower transistor $Q_{14}$ of background noise mixer circuit 28. The raw video signal from the scan detector 17 is coupled to terminal 157 and from there through the peaking network including capacitor 159 and resistor 161 to the base of the video slicer transistor $Q_{12}$. The background noise mixer combines the background noise signals into the bias level coupled to the emitter electrode of the slicing transistor $Q_{12}$ so that noise rejection is achieved and the slicing level can be adjusted into the background noise. With the dynamic clipping level coupled from negative OR gate 45 to the emitter of video slicer transistor $Q_{12}$ and the video signal coupled to the base an output signal is generated at the collector electrode whenever the video signal is more positive than the dynamic clipping signal coupled to the emitter electrode. With the collector electrode of background noise mixer transistor $Q_{14}$ being slightly more negative than its emitter electrode the transistor is power limited as far as over coming the low impedance present at the emitters of the video and black to white slicer transistors $Q_{12}$ and $Q_{13}$, respectively. As the result of this biasing arrangement only background noise is mixed into the slicing level and the stronger black signals would not be affected.

With the dynamic clipping level on the emitter of the video slicer and the raw video coupled to the base electrode, the video slicer transistor $Q_{12}$ is switched off and on depending upon the respective instantaneous polarity of the emitter limiter or clipping level bias and video signals, respectively. The voltage divider including resistors 163 and 165 insert this output signal from the video slicer 29 into the common emitter video trigger circuit 47 which converts the video signals into a two level signal representing the black and white levels respectively.

The output from the video trigger is coupled from the collector of transistor $Q_{16}$ to output terminal 167. From the output terminal 167 the two level signal goes to a positive-negative switch, hereinafter to be fully described, in which either the inverted or non-inverted operating mode is selected. The two level signal train is coupled either inverted or non-inverted from terminal 169 to one input of the video sync gate 49. The other input to the video sync gate 49 is coupled from a sync generator via terminal 171 through diode 173 to transistor $Q_{17}$. The output of the video sync gate is taken from the collector of transistor $Q_{17}$ and terminal 170 and represents the final output wavetrain video signal which would be coupled to the input terminal of the transmission media coupling the facsimile transmitter to the receiver.

The scan indicating control signal coupled to terminal 172 selectively controls the video portion of the video sync gate 49. This scan indicating control signal is commonly referred to as the pedistal not signal. This control signal is logically true during the video scan portion of each scan line of the raster sweep as contrasted to a logically false condition during the flyback portion when sync signals are commonly inserted into the data stream. Transistor $Q_{27}$ is arranged as an inverter stage and its output is coupled via diode 176 to selectively enable the video portion of OR gate 49. In operation video signals are coupled through the video portion of the video sync gate during the video trace portion of each line. Similarly diode 176 and $Q_{27}$ coact to inhibit video signals from the input of the video sync gate during flyback time. Any appropriate control signal may be coupled to terminal 174 to similarly control the duration of the active or enabled portion of the video sync gate during the video portion of each line.

The threshold detector 173 illustrated in FIG. 5 is employed to generate suitable logical control and indicating signals. As shown an input from the first background reader is coupled via terminal 174 to the input transistor $Q_{18}$ of threshold detector 173. The negative signals generated during the operation of this scanning apparatus and stored as a background level in the background reader circuit render transistor $Q_{18}$ conductive during the normal operation of the transmitter circuits. In response to the forward biasing of the first transistor, the second transistor $Q_{19}$ is rendered conductive thereby generating an appropriate signal at the collector electrode for indicating that the apparatus is in operation. For example, a video detection lamp may be selectively energized from terminal 175 whenever transistor $Q_{19}$ is rendered conductive. Similarly in response to the operation of the first background reading circuit signal coupled to the input of the transistor $Q_{18}$, transistors $Q_{20}$ and $Q_{21}$ are rendered conductive thereby generating an appropriate level signal at the collector electrode of transistor $Q_{21}$ and terminal 178 for indicating when the video circuits are off and on, respectively.

Referring now to FIG. 6 there is shown preferred circuit embodiments of the positive-negative switch circuit 177 and the phosphor noise cancelling amplifier 27. Referring first to the positive-negative switch circuit 177, it has hereinbefore been described in conjunction with FIG. 5 that the final video signal may be transmitted either in the normal or inverted mode. The inclusion of a selective inverter which may be switched into the video circuit forward of the video output facilities, for example, the reproduction of blue prints as black on white. As shown a print selection switch 179 is provided for controlling the operation of transistor $Q_{22}$ either as an inverter or non-inverter stage. The detected video is coupled from the video trigger (FIG. 5) to terminal 181 and from thence to the base electrode of transistor $Q_{22}$ and $Q_{23}$. The positive-negative switch 179 is coupled via diode 183 to the base circuit of transistor $Q_{22}$. With the switch in the position shown, i.e., minus V coupled to the swinging arm, the positive-negative switching circuit is in the normal or non-inverting mode. Thus the output signal from the collector of $Q_{23}$ is coupled via terminal 185 to the input of video gate circuit 49 (FIG. 5) in the non-inverted mode. With the arm of the positive-negative switch 179 coupled to the source of reference, for example, ground potential, i.e., in its actuated position, the positive-negative switching circuit operates in the inverting mode and thus the information signals coupled to the terminal 181 from the video detector are inverted and coupled from the collector of transistor $Q_{23}$ via terminal 185 to the input of the video sync gate 49 (FIG. 5).

As was hereinbefore described in conjunction with FIG. 1 the noise content of the trace signal is monitored by phosphor noise monitor 25 and coupled from the phosphor noise cancelling amplifier 27 to the CRT. The output of the phosphor noise monitor 25 is as shown coupled from terminal 187 via capacitor 189 to the input of phosphor noise cancelling amplifier transistor $Q_{24}$. The feedback of the amplifier is selected, i.e., the ratio of the resistors 191, 193, and 195 forming a voltage divider are such as to maintain a brightness control signal within predetermined limits. The output control signal is coupled via capacitor 197 and terminal 199 to the CRT grid thereby cancelling the noise from the CRT trace.

Referring now to FIG. 7 there is shown a composite time voltage waveform diagram illustrating the respective control signal levels employed to generate the dynamic clipping level in accordance with the principles of the present invention. Waveform 201 corresponds to a portion of a typical video waveform generated by the scanned detector 17 in response to the information modulated light rays reflected thereon from the document being scanned. The normal video information signals will lie, for example, in the range of minus 3 volts while the background or white signals will be in the range of minus 9 to minus 11 volts. If all information signals would lie in the normal signal range then a standard clipping level intermediate the background and information levels could be employed successfully to detect all information signals. The two cases illustrated in FIG. 7 show that for low contrast signals 203 and the high resolution signals 205 the respective signal levels do not correspond to the normal signal levels; however, such signals must be properly interpreted if a true facsimile copy is to be generated. As hereinbefore described a plurality of clipping levels are generated in accordance with the principles of the present invention in response to the excursions of the video signal. The various clipping level determining signals are selectively combined in a logical gate to determine the instantaneous amplitude of the dynamic clipping level. Waveform 204 illustrates the waveform generated by the background reader level and thus represents a DC signal proportional to the average or past history of the reflectivity of the background of the document being scanned. Waveform 207 represents a typical waveform out of the positive peak detector in response to the signal excursions in the analog video waveform 201. The output waveform 207 of the positive peak detector and the waveform 204 from the background reader are combined in the positive OR gate to produce waveform 209. As shown this waveform represents the most positive of the two respective inputs to the positive OR gate at each instant of time. Waveform 211 illustrates a typical waveform generated by the negative peak detector in response to the signal excursions of the analog signal waveform. Waveform 213 illustrates the translated negative peak detector waveform generated by translating the output waveform from the negative peak detector as a function of the rectified CRT noise signal.

As was hereinbefore described in conjunction with FIGS. 1 and 4 the output of the respective positive OR gate and the output of the negative OR gate translated a predetermined amount as a function of the noise signal are combined in a negative OR gate to generate the composite dynamic clipping level. Waveform 215 illustrates the dynamic clipping level thus generated by the polarity sensitive logical combination of the above-mentioned instantaneous level or clipping signals. This dynamic clipping level generated in response to the excursions of the analog video signal permits the clipping level to dynamically follow the analog video signal within an envelope described by a level following above the positive peaks of the background noise present when background is being detected and by a level slightly more negative than the positive peaks when information signals are being detected. As shown this permits the detection of the low level signals 203 even though the excursion in the video signal does not reach the normal video level. Similarly this dynamic analog clipping envelope permits the detection of the high resolution signals such as 205 even through the analog excursions do not reach the normal white or background level intermediate such information signals. As was hereinbefore described in conjunction with FIG. 2 the video signal from the video slicer and video trigger comprise a digitalized signal with the information or black levels corresponding to that duration of the excursions of the analog signal which fall above the instantaneous dynamic clipping level.

In the foregoing there has been disclosed novel methods and apparatus for detecting signal portions in the presence of widely varying background levels in an analog video signal. By employing a plurality of control signals generated in response to the excursions of the video signal and selectively combining the signals in a predetemined polarity sensitive manner, it is possible to enhance the low resolution capabilities of the system without forfeiting or sacrificing high resolution capabilities. As would be evident to those skilled in the art many modifications may be made in the circuit apparatus for practicing the present invention without departing from the spirit of the present invention. It is therefore applicant's intention to be limited only as indicated by the scope of the following claims.

What is claimed is:

1. In a facsimile transmitter an improved video circuit comprising:
- means for generating analog video signals corresponding to information and background portions of a document being scanned along a predetermined raster type sweep,
- means for generating a background bias signal proportional in magnitude to the average reflectance of the background of said document being scanned,
- positive peak detector circuit means for generating a first dynamic clipping level determing control signal proportional to the polarity excursions of said video signals,
- negative peak detector and stretcher means for generating a second dynamic clipping level determining control signal proportional to the polarity excursions of said video signals,
- first logical gating means for combining on a predetermined polarity sensitive basis, said background signal and said first dynamic clipping level determing signal,
- second logical gating means for combining on a predetermined polarity sensitive basis said second dynamic clipping level determining control signal and the output of said first logical gating means, and
- video slicer means responsive to said video signal and the output of said second logical gating means for characterizing signal excursions in said video signal as background and information levels respectively.

2. The video circuit defined in claim 1 wherein said positive and negative peak detector means each includes a capacitor and a plurality of asymmetrically conductive current path means for providing different time constants for charging each of said capacitors in response to video signal excursions towards one polarity and towards an opposite polarity.

3. The video circuit defined in claim 1 wherein said first and said second logical gating means comprise positive OR gate means for selecting the most positive signal coupled to its respective inputs and negative OR gate means for selecting the most negative signal coupled to its respective inputs respectively.

4. The video circuit defined in claim 1 additionally including first level translator means for insuring the video signal coupled to said positive peak detector is more negative than the average background level signal coupled to the positive gating means from said background bias signal generating means.

5. In a facsimile transmitter including an electro-optical scanning apparatus for generating electric video signals corresponding to the information and background portions of a document being scanned along a scanning raster and additionally including noise monitor means for sensing noise components in the composite video and noise signal attributable to the source of image exploring rays, an improved dynamic clipping circuit comprising:
- means for generating a background bias signal proportional in magnitude to average reflectance of the background of the document being scanned,
- positive peak detector circuit means for generating a first dynamic clipping level determining control signal proportional to the excursions of the said video signal,
- negative peak detector circuit means for generating a second dynamic clipping level determining control signal proportional to the excursions of said video signal,
- translator circuit means responsive to said noise signals from said noise monitor means for translating said second dynamic clipping level determining control signal in an amount proportional to the noise content of said video signal,
- first logical gating means for selecting the most positive signal portion from the instantaneous signal level of said signal from said positive peak detector circuit means and said background signal,
- second logical gating means for selecting the most negative signal on an instantaneous basis from the signals generated by the translation circuit means and said first logical gating means, and
- video slicer means responsive to said video signal and the output of said second logical gating means for characterizing signal portions in said video signal as background and information levels respectively.

6. A dynamic clipping circuit defined in claim 5 wherein said translator circuit means comprises:
- an amplifier,
- means for coupling said noise signal from said noise monitor means to the input of said amplifier,
- a transformer including a primary winding and a secondary winding,
- means for coupling the primary winding of said transformer to the output of said amplifier,
- rectifier and filter means for generating a control level proportional to the noise content of said video signal,
- mixing means for combining the output of said negative peak detector and stretcher and the output of said rectifier and filter means.

7. A dynamic clipping circuit defined in claim 6 wherein said mixing means comprises a potentiometer having a pair of input terminals and a tap,
- means for coupling the respective end terminals of said potentiometer across the output of said rectifier and filter means,
- circuit means for coupling the output of said negative peak detector and stretcher means to warn off said end terminals of said potentiometer, and
- circuit means for coupling the tap of said potentiometer to an input of said second logical gating means.

8. The video circuit defined in claim 2 wherein said asymmetrically conductive current path means operably associated respectively with said positive peak detector means and with said negative peak detector means selectively provides substantially different and opposite time constants for the respective detector means in response to signal excursions toward one polarity and towards the opposite polarity respectively.

9. The clipping circuit defined in claim 6 additionally including background mixer circuit means responsive to said negative peak detector and said video signals for achieving noise cancellation action in the dynamic clipping level coupled to said video slicer means.

10. The clipping circuit defined in claim 9 wherein said video slicer means and said background mixer circuit means comprise a pair of opposite conductivity transistors each having a base, emitter and collector electrode and additionally including resistive means for coupling said video signal to the respective base electrodes of said transistors, resistive means for intercoupling the respective emitter electrodes of said transistors, circuit means for coupling the output of said negative peak detector to the collector electrode of said background mixer transistor and circuit means for coupling the collector of said slicer transistor to a source of operating potential.

11. In a video circuit including electro-optical scanning apparatus for generating electric video signals corresponding to the information and background portions of a document being scanned along a scanning raster and additionally including noise monitor means for sensing noise components in the composite video and noise signal attributable to the source of image exploring rays, an improved dynamic clipping circuit comprising:
- first, second and third capacitive means for individually generating dynamic clipping level determining signals in response to excursions of said video signal, first input terminal means for receiving said video signal, second input terminal means for receiving said noise signal from said noise monitor, first current path means for charging said first capacitor means to an average value substantially corresponding to the average reflective of the background of the document being scanned, second current path means including a signal level translator circuit and a plurality of parallel asymmetrical conductive polarity sensitive current paths for providing a charging path for said second capacitive means in response to excursions in said video signal, third current path means including a plurality of parallel asymmetrically conductive polarity sensitive current paths for providing a charging path for said third capacitor means in response to excursions in said video signal, noise detector and rectifier means including a potentiometer for selectively shifting the level of said dynamic clipping level determining signal generated by said third capacitive means as a function of the magnitude of said noise signal, first logical gating means for selecting on a polarity basis portions of said dynamic clipping level determining signals generated by said first and second capacitive means respectively, second logical gating means for selecting on a polarity basis portions of the shifted dynamic clipping level determining signal generated by said third capacitive means and the output of said first logical gating means, and slicer means responsive to said second logical gating means and said video signal for characterizing successive portions of said video signal as information and background levels respectively.

12. In a facsimile transmitter including an electro-optical scanning apparatus for generating electric video signals corresponding to the respective information and background portions of a document being scanned along a predetermined scanning raster and additionally including noise monitor means for sensing noise components in the composite video and noise signals, and improved dynamic clipping circuit comprising:

means for generating a background bias signal proportional in magnitude to the average reflectance of the background of the document being scanned;

first circuit means for generating a first dynamic clipping level determining control signal proportional to the excursions of said electric video and noise signals, second circuit means for generating a second dynamic clipping level determining control signal proportional to the excursions of said electric video and noise signals, translator circuit means responsive to said noise signals from said noise monitor means for translating said second dynamic clipping level determining control signal in an amount propotrional to the noise content of said video and noise signal, signal translator circuit means for coupling said electric video signals to the input of said first circuit means, logical gating means for combining portions of said background signal, said first dynamic clipping level determining control signal and said second dynamic clipping level determining control signal on a predetermined polarity basis for generating a dynamic clipping level signal, and video slicer means responsive to said video signals and said dynamic video clipping level signal for characterizing portions of said electric video signals as background and information levels respectively.

13. The improved dynamic clipping circuit according to claim 12 wherein said signal translator circuit means comprises at least one diode, said diode being poled in the direction of normal forward curent conduction.

References Cited

UNITED STATES PATENTS

| | | | |
|---|---|---|---|
| 3,223,778 | 12/1965 | Stone et al. | 178—7.1 |
| 3,322,893 | 5/1967 | Townsend | 178—6.8 |
| 3,379,826 | 4/1968 | Gray | 178—7.1 |

RICHARD MURRAY, Primary Examiner

A. H. EDDLEMAN, Assistant Examiner

U.S. Cl. X.R.

178—7.1, 6.8